(12) United States Patent
Iwata et al.

(10) Patent No.: US 8,228,699 B2
(45) Date of Patent: Jul. 24, 2012

(54) POWER CONVERTING APPARATUS INCLUDING HALF-BRIDGE INVERTERS CONNECTED BETWEEN POSITIVE AND NEGATIVE TERMINALS OF A DC POWER SUPPLY

(75) Inventors: Akihiko Iwata, Chiyoda-ku (JP); Hiroshi Ito, Chiyoda-ku (JP); Hirofumi Akagi, Meguro-ku (JP); Hideaki Fujita, Meguro-ku (JP); Takushi Jimichi, Meguro-ku (JP)

(73) Assignees: Mitsubishi Electric Corporation, Tokyo (JP); Tokyo Institute of Technology, Tokyo (JP)

( * ) Notice: Subject to any disclaimer, the term of this patent is extended or adjusted under 35 U.S.C. 154(b) by 390 days.

(21) Appl. No.: 12/527,869

(22) PCT Filed: Feb. 20, 2008

(86) PCT No.: PCT/JP2008/000276
§ 371 (c)(1),
(2), (4) Date: Sep. 14, 2009

(87) PCT Pub. No.: WO2008/102552
PCT Pub. Date: Aug. 28, 2008

(65) Prior Publication Data
US 2011/0128763 A1    Jun. 2, 2011

(30) Foreign Application Priority Data
Feb. 22, 2007   (JP) ................... 2007-041783

(51) Int. Cl.
*H02M 7/5387*    (2007.01)
*H02M 3/24*    (2006.01)

(52) U.S. Cl. ........................................ 363/132; 363/98
(58) Field of Classification Search ................... 323/906;
363/21.03, 56.04, 41, 131, 132
See application file for complete search history.

(56) References Cited

U.S. PATENT DOCUMENTS
6,111,379 A * 8/2000 Feldtkeller .................... 318/471
(Continued)

FOREIGN PATENT DOCUMENTS
JP         62 42213         2/1987
(Continued)

OTHER PUBLICATIONS

U.S. Appl. No. 12/527,709, filed Aug. 19, 2009, Iwata, et al.
U.S. Appl. No. 13/127,132, filed May 2, 2011, Iwata, et al.

*Primary Examiner* — Adolf Berhane
*Assistant Examiner* — Emily Pham
(74) *Attorney, Agent, or Firm* — Oblon, Spivak, McClelland, Maier & Neustadt, L.L.P.

(57) ABSTRACT

A power converting apparatus includes three sets of half-bridge inverters connected between output terminals of a solar battery, each of the half-bridge inverters including two series-connected switching devices, single-phase inverters connected to individual AC output lines of the bridge inverters, and two series-connected capacitors dividing a voltage of the solar battery, wherein output terminals of the single-phase inverters are connected to individual phases of a three-phase power system. Each of the half-bridge inverters is operated to output one pulse per half cycle, each of the single-phase inverters is controlled by PWM control operation to make up for a voltage insufficiency from the system voltage, and sums of outputs of the half-bridge inverters and the single-phase inverters are output to the power system.

23 Claims, 11 Drawing Sheets

U.S. PATENT DOCUMENTS

| | | | |
|---|---|---|---|
| 6,154,379 A * | 11/2000 | Okita | 363/40 |
| 6,437,998 B1 * | 8/2002 | Mino et al. | 363/37 |
| 7,355,869 B2 * | 4/2008 | Okamura | 363/132 |
| 7,433,212 B2 * | 10/2008 | Igarashi et al. | 363/37 |
| 2009/0116268 A1 * | 5/2009 | Kishida et al. | 363/68 |

FOREIGN PATENT DOCUMENTS

| | | |
|---|---|---|
| JP | 2001 103768 | 4/2001 |
| JP | 2004 7941 | 1/2004 |
| JP | 2005 33895 | 2/2005 |
| WO | 2008 102551 | 8/2008 |

* cited by examiner

POWER CONVERTING APPARATUS INCLUDING HALF-BRIDGE INVERTERS CONNECTED BETWEEN POSITIVE AND NEGATIVE TERMINALS OF A DC POWER SUPPLY

TECHNICAL FIELD

The present invention relates to a power converting apparatus for converting DC power into AC power and, more particularly, to a power converting apparatus for connecting a distributed power generation source, such as a solar battery, to a power system.

BACKGROUND ART

One conventional power converting apparatus is a below-described power converting apparatus for solar power generation which converts DC power fed from a solar battery into AC power with three-phase outputs and delivers this AC power to a three-phase power system of which one phase is grounded, the power converting apparatus being connected to the power system. This power converting apparatus includes an inverter circuit having two sets of series circuits, each including two switching devices, wherein a plurality of capacitors for dividing a DC voltage are connected in series between DC input portions of the inverter circuit, one output line is taken out from a connecting point of the capacitors as one of the three-phase outputs, and two output lines are taken out from intermediate points of the individual sets of switching devices as the other two of the three-phase outputs to configure a half-bridge inverter circuit, and wherein the output line taken out from the connecting point of the capacitors is connected to the aforementioned grounded phase. Further, a DC/DC converter is provided in a stage preceding the half-bridge inverter circuit, and an output of the solar battery is connected to an input of the DC/DC converter. The half-bridge inverter circuit convert the DC voltage into an AC voltage by switching operation (refer to Patent Document 1, for example).

Patent Document 1: Japanese Laid-open Patent Application No. 2001-103768

DISCLOSURE OF THE INVENTION

Problems to be Solved by the Invention

A solar battery does not have a high dielectric withstand voltage so that there are limitations in increasing a maximum output voltage. Also, an output voltage of the solar battery decreases if panel temperature of the same rises or an output current thereof increases. For this reason, the power converting apparatus shown in Patent Document 1 cited above is provided with the DC/DC converter to increase the voltage of the solar battery up to a desired voltage. This approach could create a problem that the apparatus would become large-sized and costly and loss due to the DC/DC converter would decrease efficiency of the power converting apparatus.

Furthermore, since striplike waveforms produced from relatively high rectangular voltages are output by the switching operation of the half-bridge inverters, there occurs a large switching loss which causes a decrease in the efficiency of the power converting apparatus. Also, since rectangular voltages output from the half-bridge inverters are smoothed, there is a need for a large-capacity filter, thus producing a problem that the structure of the apparatus increases in size.

The present invention has been made to overcome the aforementioned problems. Accordingly, it is an object of the invention to provide a structure of a power converting apparatus featuring a compact apparatus structure and low cost, as well as a high converting efficiency.

Means for Solving the Problems

A power converting apparatus according to the present invention includes plural sets of half-bridge inverters connected between positive and negative terminals of a DC power supply, each set of half-bridge inverters including two series-connected switching devices, single-phase inverters connected in series with individual AC output lines of the plural sets of half-bridge inverters, and two series-connected capacitors for dividing a voltage of the DC power supply which is a DC input of the half-bridge inverters. Output terminals of the individual single-phase inverters are connected to individual phases of a power system and an intermediate point of the two series-connected capacitors is connected to a neutral point of AC outputs from the plurality of single-phase inverters. Each of the half-bridge inverters is caused to output one pulse of voltage of which pulsewidth is approximately a half cycle every half cycle of a system voltage and the individual single-phase inverters are controlled by pulse-width modulation (PWM) control operation to make up for a voltage insufficiency from the system voltage.

Advantageous Effects of the Invention

In the power converting apparatus of the present invention, the single-phase inverters are connected to the AC output lines of the half-bridge inverters so that the apparatus outputs combinations of output voltages of the half-bridge inverters and output voltages of the respective single-phase inverters. For this reason, it is possible to decrease a DC input voltage of the half-bridge inverters, make a DC/DC converter which has conventionally been provided in a preceding stage unnecessary, make an apparatus structure compact and less costly and achieve improved converting efficiency. Also, since each of the half-bridge inverters is caused to output one pulse of voltage of which pulsewidth is approximately the half cycle every half cycle of a system voltage and the individual single-phase inverters are controlled by the PWM control operation to make up for the voltage insufficiency from the system voltage, the PWM control operation is performed at a relatively low voltage, making it possible to reduce switching loss as well as the capacity of each output filter. This serves to make the apparatus structure more compact and still less costly and achieve further improved converting efficiency.

BEST MODES FOR CARRYING OUT THE INVENTION

First Embodiment

Figure 1:
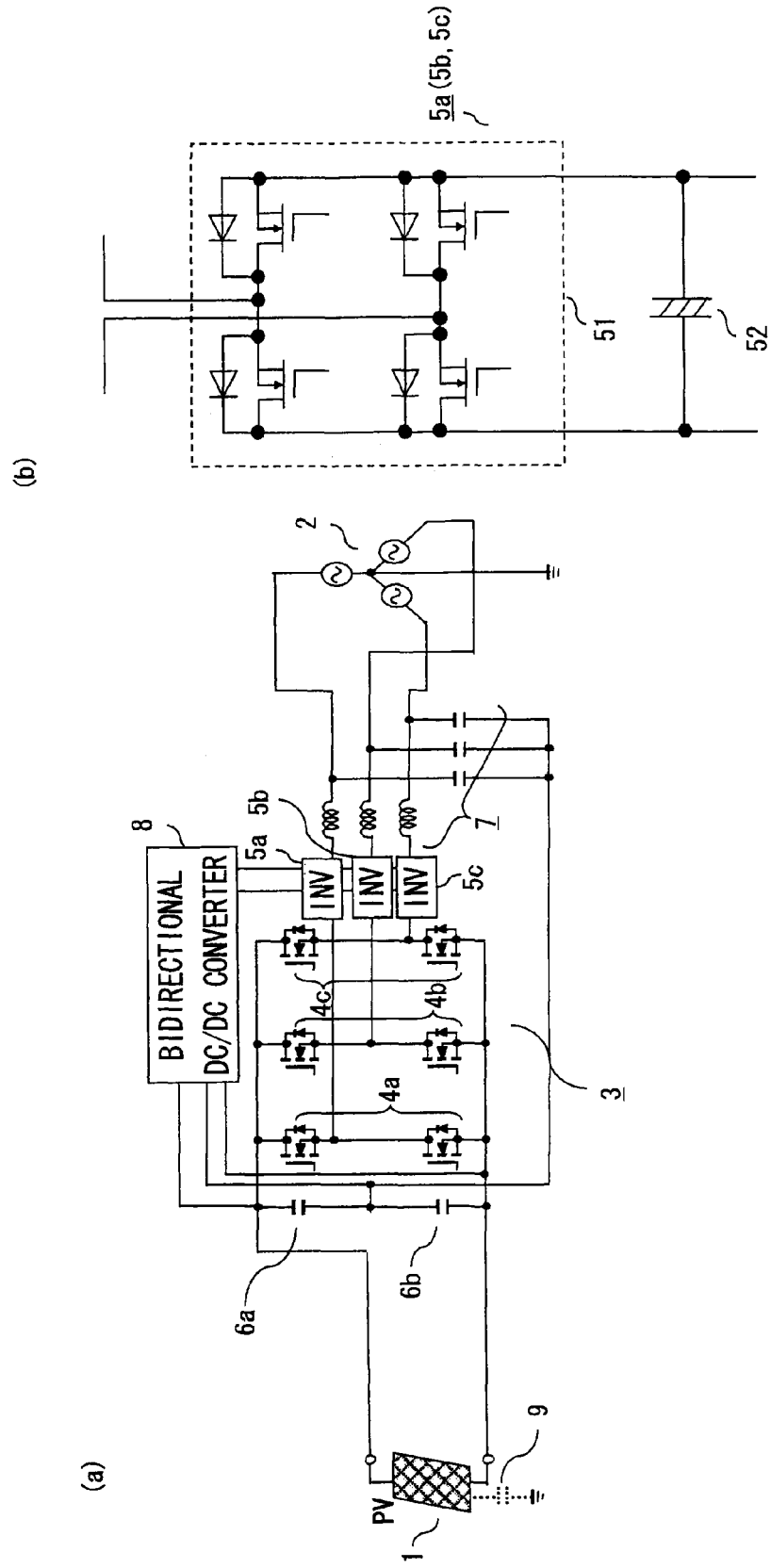
FIG. 1 is a circuit diagram showing the configuration of a three-phase power converting apparatus according to a first embodiment of the present invention.

A three-phase power converting apparatus serving as a power converting apparatus according to a first embodiment of the present invention is described with reference to the drawings hereinbelow. FIG. 1(a) is a circuit diagram showing the configuration of the three-phase power converting apparatus according to the first embodiment of the present invention, and FIG. 1(b) is a partially enlarged diagram of FIG. 1(a).

As shown in the Figure, the three-phase power converting apparatus converts DC power fed from a solar battery 1 into AC power and outputs the AC power to a three-phase power system 2. In this case, the power system 2 has a Y-connected configuration of which neutral point is grounded. The three-phase power converting apparatus is provided with an inverter circuit 3 including three sets of half-bridge inverters 4a-4c, each of which is made up of two series-connected switching devices, and single-phase inverters 5a-5c which are connected in series with individual AC output lines of the three sets of half-bridge inverters 4a-4c, respectively.

The three sets of half-bridge inverters 4a-4c are connected between positive and negative terminals from which a voltage generated by the solar battery panel 1 is output, so that the half-bridge inverters 4a-4c utilize the output voltage of the solar battery 1 as a DC input. Also, two capacitors 6a, 6b for dividing the DC voltage are connected in series across this DC input portion. There are provided filter circuits 7 each of which is made up of a reactor- and a capacitor at an output side of the individual single-phase inverters 5a-5c, and output terminals of the single-phase inverters 5a-5c are connected to respective phases of the power system 2 through the filter circuits 7.

Also, a connecting point of the filter circuits 7 of the individual phases corresponding to the neutral point of three-phase AC outputs from the three-phase power converting apparatus is connected to a connecting point of the two capacitors 6a, 6b. Since this arrangement serves to keep the potential of the solar battery 1 from fluctuating with respect to a ground, charging and discharging currents to and from a stray capacitance 9 between the panel of the solar battery 1 and the ground are suppressed.

Each of the single-phase inverters 5a-5c is provided with a full-bridge inverter 51 made up of four switching devices and a capacitor 52 which serves as a DC portion for maintaining a voltage as shown in FIG. 1(b). Output voltages of the single-phase inverters 5a-5c of the individual phases are added to output voltages of the half-bridge inverters 4a-4c of the relevant phases, and voltages obtained by adding the output voltages of the half-bridge inverters 4a-4c and the output voltages of the single-phase inverters 5a-5c, respectively, are output to the power system 2. Incidentally, the voltage of the capacitor 52 of each of the single-phase inverters 5a-5c is made lower than the voltage of the DC portion of the half-bridge inverters 4a-4c, that is, the output voltage of the solar battery 1.

Further, the capacitors 52 of the individual single-phase inverters 5a-5c and the two capacitors 6a, 6b connected across the DC input portion of the half-bridge inverters 4a-4c are connected through a DC/DC converter 8 which permits bidirectional energy exchange.

Figure 2:
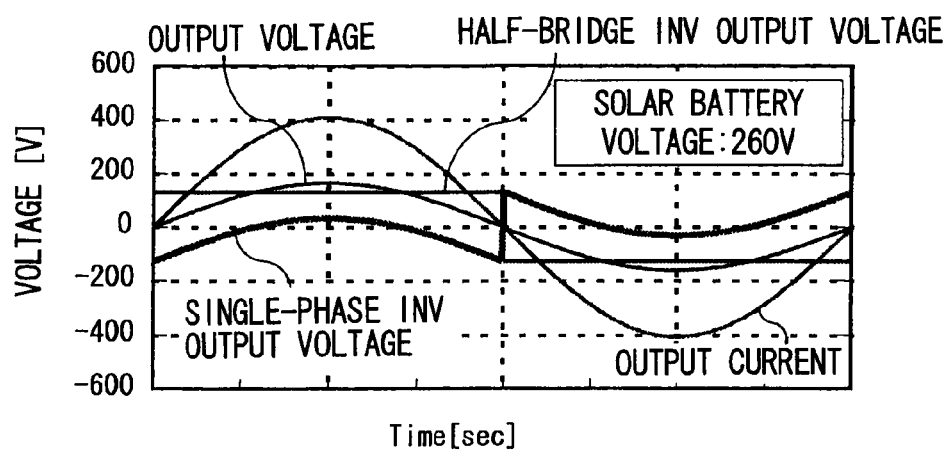
FIG. 2 is a diagram of voltage waveforms showing operation of the three-phase power converting apparatus according to the first embodiment of the present invention.

Operation of the three-phase power converting apparatus thus configured is described below with reference to operating voltage waveforms shown in FIG. 2.

Each of the half-bridge inverters 4a-4c generates voltages of both polarities centering on zero level at half-cycle intervals, in which a width between the voltages of both polarities (i.e., a difference between the positive and negative voltages) matches the level of the voltage of the solar battery 1, that is, a DC input voltage which is 260 V in this case. The individual single-phase inverters 5a-5c are controlled by high-frequency PWM control operation in such a manner as to make up for differences between an output voltage (system voltage) required by the entirety of three-phase power converting apparatus and the output voltages of the respective half-bridge inverters 4a-4c.

As shown in the Figure, each of the single-phase inverters 5a-5c generates a voltage of a polarity opposite to the output voltage in regions where the phase is close to 0 degrees and 180 degrees, whereas each of the single-phase inverters 5a-5c outputs a voltage of the same polarity as the output voltage in a region where the phase is close to 90 degrees.

The power system 2 has the Y-connected configuration of which neutral point of the three phases is grounded in this case. If the system voltage (line-to-line voltage) is 200 VAC, a maximum voltage value of a phase voltage becomes approximately 163 V and a peak-to-peak value between the maximum and minimum voltage values of the phase voltage is larger than the voltage of the solar battery 1. Since the three-phase power converting apparatus which is required to produce an output voltage equivalent to the system voltage outputs the voltages obtained by adding the output voltages of the half-bridge inverters 4a-4c and the output voltages of the single-phase inverters 5a-5c, respectively, the three-phase power converting apparatus can output a voltage higher than the voltage of the solar battery 1 which is the DC input voltage of the half-bridge inverters 4a-4c.

As seen above, a high voltage can be output with no need for a voltage boosting circuit which has conventionally been provided in a preceding stage of the three-phase power converting apparatus in this embodiment. It is therefore possible to make the apparatus structure compact and less costly and achieve improved converting efficiency.

Also, since each of the half-bridge inverters 4a-4c is operated to output one pulse per half cycle, almost no switching loss occurs. Since a DC voltage supplied to the single-phase inverters 5a-5c which is controlled by the PWM control operation at a high frequency is set at a smaller value compared to the DC voltage supplied to the half-bridge inverters 4a-4c, it is possible to reduce switching loss caused by the PWM control operation. Furthermore, since the amplitude of rectangular voltages produced by the PWM control operation is small, it is possible to reduce the capacity of each filter circuit 7 provided in a succeeding stage. For this reason, it is possible to further improve the converting efficiency and make the apparatus structure more compact and still less costly.

Next, a power burden born by the single-phase inverters 5a-5c is explained in the following. Each of the single-phase inverters 5a-5c generates the voltage of the polarity opposite to the output voltage in the regions where the phase is close to 0 degrees and 180 degrees, whereas each of the single-phase inverters 5a-5c outputs the voltage of the same polarity as the output voltage in the region where the phase is close to 90 degrees as mentioned above.

In the case of control operation in which the phase of an output current is matched with the phase of the output voltage (operation at a power factor of 1), each of the single-phase inverters 5a-5c is operated to charge the capacitor 52 in the regions where the phase is close to 0 degrees and 180 degrees and, on the contrary, each of the single-phase inverters 5a-5c discharges the capacitor 52 in the region where the phase is close to 90 degrees.

If the output voltage of the three-phase power converting apparatus is 200 VAC and the DC voltage of the half-bridge inverters 4a-4c (i.e. the voltage of the solar battery 1) is 260 VDC, the amounts of electric power supplied to and demanded by the single-phase inverters 5a-5c are balanced during a half cycle and, thus, become approximately zero as a whole. When the DC voltage of the half-bridge inverters 4a-4c varies, however, the amounts of electric power supplied to and demanded every half cycle by the single-phase inverters 5a-5c which are controlled by the PWM control operation to make up for an insufficiency of the output voltages of the half-bridge inverters 4a-4c go out of balance. As a consequence, it becomes necessary to supply positive and negative quantities of electric power to the capacitors 52 of the single-phase inverters 5a-5c. Nevertheless, since the DC/DC converter 8 is connected between the two capacitors 6a, 6b which constitute the DC portion of the half-bridge inverters 4a-4c and the capacitors 52 which constitute a DC portion of the single-phase inverters 5a-5c, it is possible to exchange necessary electric power between the capacitors 6a, 6b and the capacitors 52.

Figure 3:
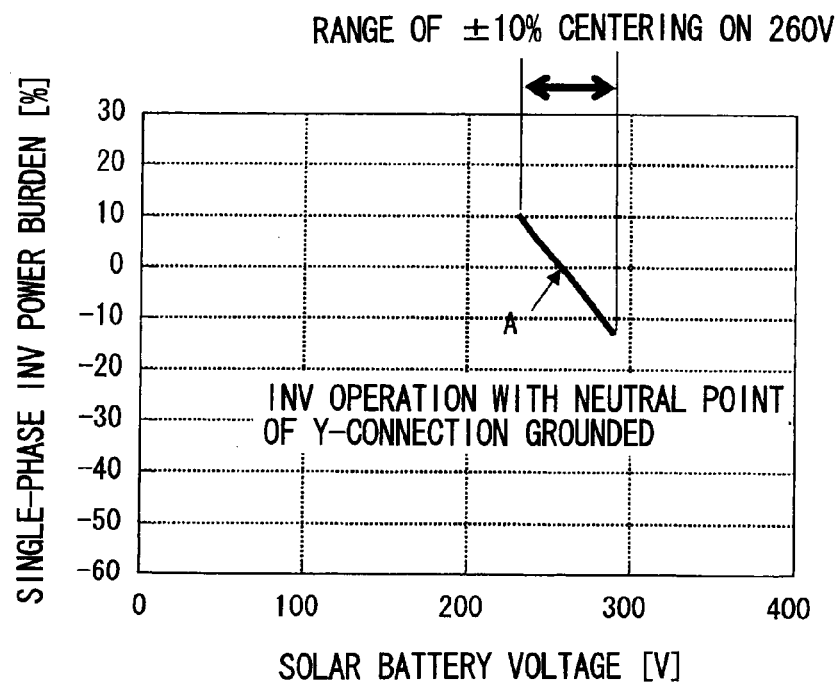
FIG. 3 is a diagram showing a relationship between voltage of a solar battery and a power burden born by single-phase inverters according to the first embodiment of the present invention.

Shown in FIG. 3 is a relationship between the DC voltage of the half-bridge inverters 4a-4c, or the voltage of the solar battery 1, and electric power (power burden) handled by the single-phase inverters 5a-5c, or the electric power handled by the DC/DC converter 8 under conditions where the output voltage of the three-phase power converting apparatus is 200 VAC.

When the voltage of the solar battery 1 is 260 V (point A in the Figure), the total amount of electric power supplied to and demanded by the single-phase inverters 5a-5c every half cycle is approximately zero, that is, the power burden is approximately 0 as discussed above. If the solar battery voltage rises from this point A, the single-phase inverters 5a-5c receive electric power on average. If the solar battery voltage drops from this point A, on the other hand, the single-phase inverters 5a-5c supply electric power on average.

Under steady-state conditions, the voltage of the solar battery 1 is determined chiefly by temperature, that is, the higher the temperature, the voltage drops, and the lower the temperature, the voltage increases. When temperature variations are taken into consideration, the amount of variations in the output voltage falls within a range of approximately ±10%, so that electric power required at present by the single-phase inverters 5a-5c is to be exchanged through the DC/DC converter 8.

As shown in FIG. 3, the amount of variations in the output voltage of the solar battery 1 falls within the range of approximately ±10%, so that the electric power handled by the single-phase inverters 5a-5c also becomes approximately ±10% of output power. Specifically, since the electric power handled by the DC/DC converter 8 is approximately ±10% of total electric power, the DC/DC converter 8 is of a compact size and low cost and, thus, a loss produced by the DC/DC converter 8 has little influence which is of a negligible level.

As seen above, the DC/DC converter 8 is connected between the two capacitors 6a, 6b which constitute the DC portion of the half-bridge inverters 4a-4c and the capacitors 52 which constitute the DC portion of the single-phase inverters 5a-5c in this embodiment so that the necessary electric power can be exchanged between the capacitors 6a, 6b and the capacitors 52. It is therefore possible to stabilize the DC voltage of the single-phase inverters 5a-5c and output a stable AC voltage to the power system 2 regardless of variations in the output voltage of the solar battery 1. Also, since the DC/DC converter 8 is of a compact size and low cost and the influence of the loss thereof is almost negligible, the provision of the DC/DC converter 8 does not produce adverse effects on the entirety of three-phase power converting apparatus. Accordingly, the converting efficiency is improved and the apparatus structure which has been made even more compact and still less costly makes it possible to obtain a stable output with higher reliability as discussed above.

Second Embodiment

While the power system 2 has the Y-connected configuration of which neutral point is grounded in the foregoing embodiment, a second embodiment of the present invention described hereunder is a case in which electric power is supplied from a three-phase power converting apparatus to a power system 2a having a delta-connected configuration of which one phase is grounded.

Figure 4:
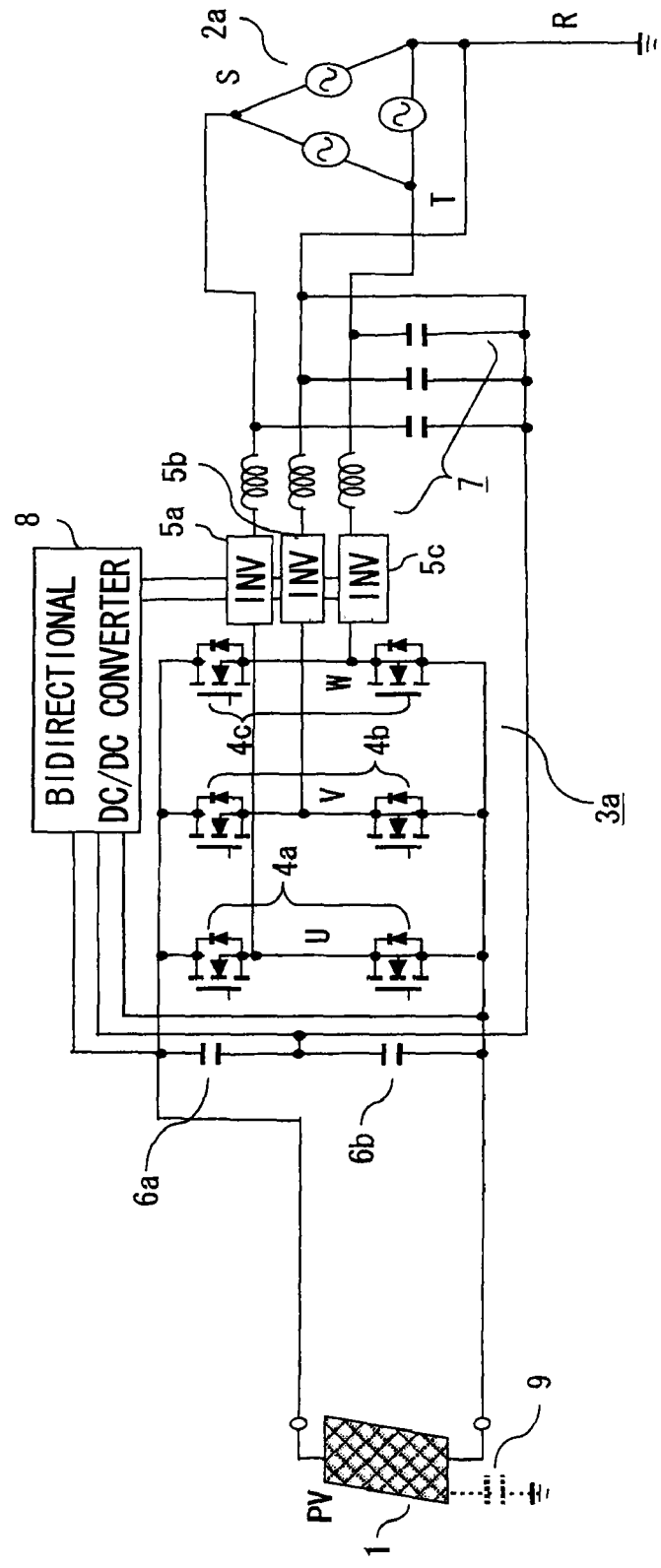
FIG. 4 is a circuit diagram showing the configuration of a three-phase power converting apparatus according to a second embodiment of the present invention.

FIG. 4 is a circuit diagram showing the configuration of the three-phase power converting apparatus according to the second embodiment of the present invention. As shown in the Figure, the three-phase power converting apparatus is provided with an inverter circuit 3a including three sets each of half-bridge inverters 4a-4c and single-phase inverters 5a-5c, two series-connected capacitors 6a, 6b, filter circuits 7 and a DC/DC converter 8 which are the same as the foregoing first embodiment. In this case, however, an intermediate point of the two series-connected capacitors 6a, 6b is connected to a connecting point of the filter circuits 7 of individual phases and this intermediate point is connected to a grounded R phase of the power system 2a.

Since a V phase of the inverter circuit 3a is connected to the grounded R phase of the power system 2a, it is necessary that an output potential of the V phase be kept at the same potential as the ground. Accordingly, neither the half-bridge inverter 4b nor the single-phase inverter 5b in a succeeding stage thereof performs operation for generating a voltage and, thus, individual switching devices are kept substantially in an OFF state. This means that the three-phase power converting apparatus supplies electric power to the power system 2a by using the half-bridge inverters 4a, 4c of U- and W-phases and the single-phase inverters 5a, 5c in succeeding stages thereof. In this case, it is necessary to generate an AC voltage having an amplitude of $200/\sqrt{2}$V between the grounded R phase and each of S and T phases. Also, to ensure that currents and voltages of the power system 2a match in phase, phases of output currents of the half-bridge inverters 4a, 4c are advanced by 30 degrees from those of the output voltages of the half-bridge inverters 4a, 4c.

Since the potential of a solar battery 1 is kept from fluctuating with respect to the ground in this case too as in the first embodiment, charging and discharging currents to and from a stray capacitance 9 between the panel of the solar battery 1 and the ground are reduced. The single-phase inverters 5a-5c also have the same configuration as in the first embodiment, and the voltage of the capacitor 52 of each of the single-phase inverters 5a-5c is made lower than the voltage of the DC portion of the half-bridge inverters 4a-4c, that is, the output voltage of the solar battery 1.

Operation of the three-phase power converting apparatus thus configured is described below with reference to operating voltage waveforms shown in FIG. 5.

The two sets of half-bridge inverters 4a, 4c generate voltages of both polarities centering on zero level at half-cycle intervals, in which a width between the voltages of both polarities (i.e., a difference between the positive and negative voltages) matches the level of the voltage of the solar battery 1, that is, a DC input voltage which is 400 V in this case. The single-phase inverters 5a, 5c are controlled by the high-frequency PWM control operation in such a manner as to make up for differences between an output voltage (system voltage) required by the entirety of three-phase power converting apparatus and the output voltages of the respective half-bridge inverters 4a, 4c.

As shown in the Figure, each of the single-phase inverters 5a, 5c generates a voltage of a polarity opposite to the output voltage in regions where the phase is close to 0 degrees and 180 degrees, whereas each of the single-phase inverters 5a, 5c outputs a voltage of the same polarity as the output voltage in a region where the phase is close to 90 degrees.

The power system 2a has the delta-connected configuration of which R phase is grounded in this case. If the system voltage is 200 VAC, a maximum voltage value becomes approximately 282 V and a peak-to-peak value between the maximum and minimum voltage values is larger than the voltage of the solar battery 1. Since the three-phase power converting apparatus which is required to produce an output voltage equivalent to the system voltage outputs voltages obtained by adding the output voltages of the half-bridge inverters 4a, 4c and the output voltages of the single-phase inverters 5a, 5c, respectively, the three-phase power converting apparatus can output a voltage higher than the voltage of the solar battery 1 which is the DC input voltage of the half-bridge inverters 4a, 4c.

When connecting the three-phase power converting apparatus to a power system having a delta-connected configuration of which one phase is grounded, it has conventionally been required to set a DC input voltage of half-bridge inverters at 600 V or above. However, a solar battery does not have a high dielectric withstand voltage so that it is a common practice to set a maximum output voltage of 600 V or less. Also, if panel temperature of the solar battery rises or an output current thereof increases, an output voltage of the battery further decreases. Therefore, a voltage at which maximum electric power can be taken-out is approximately between 400 V and 500 V. For this reason, the conventional three-phase power converting apparatus has been provided with a voltage boosting circuit in a preceding stage as previously mentioned to increase the DC input voltage of the half-bridge inverters to 600 V or above.

In this embodiment, a high voltage can be output with no need for the voltage boosting circuit, so that it is possible to make the apparatus structure compact and less costly and achieve improved converting efficiency.

Also, since each of the half-bridge inverters 4a, 4c is operated to output one pulse per half cycle, almost no switching loss occurs. Since a DC voltage supplied to the single-phase inverters 5a, 5c which is controlled by the PWM control operation at a high frequency is set at a smaller value compared to the DC voltage supplied to the half-bridge inverters 4a, 4c, it is possible to reduce switching loss caused by the PWM control operation. Furthermore, since the amplitude of rectangular voltages produced by the PWM control operation is small, it is possible to reduce the capacity of each filter circuit 7 provided in a succeeding stage. For this reason, it is possible to further improve the converting efficiency and make the apparatus structure more compact and still less costly.

Next, a power burden born by the single-phase inverters 5a, 5c is explained in the following. Each of the single-phase inverters 5a-5c generates the voltage of the polarity opposite to the output voltage in the regions where the phase is close to 0 degrees and 180 degrees, whereas each of the single-phase inverters 5a-5c outputs the voltage of the same polarity as the output voltage in the region where the phase is close to 90 degrees as mentioned above.

Figure 5:
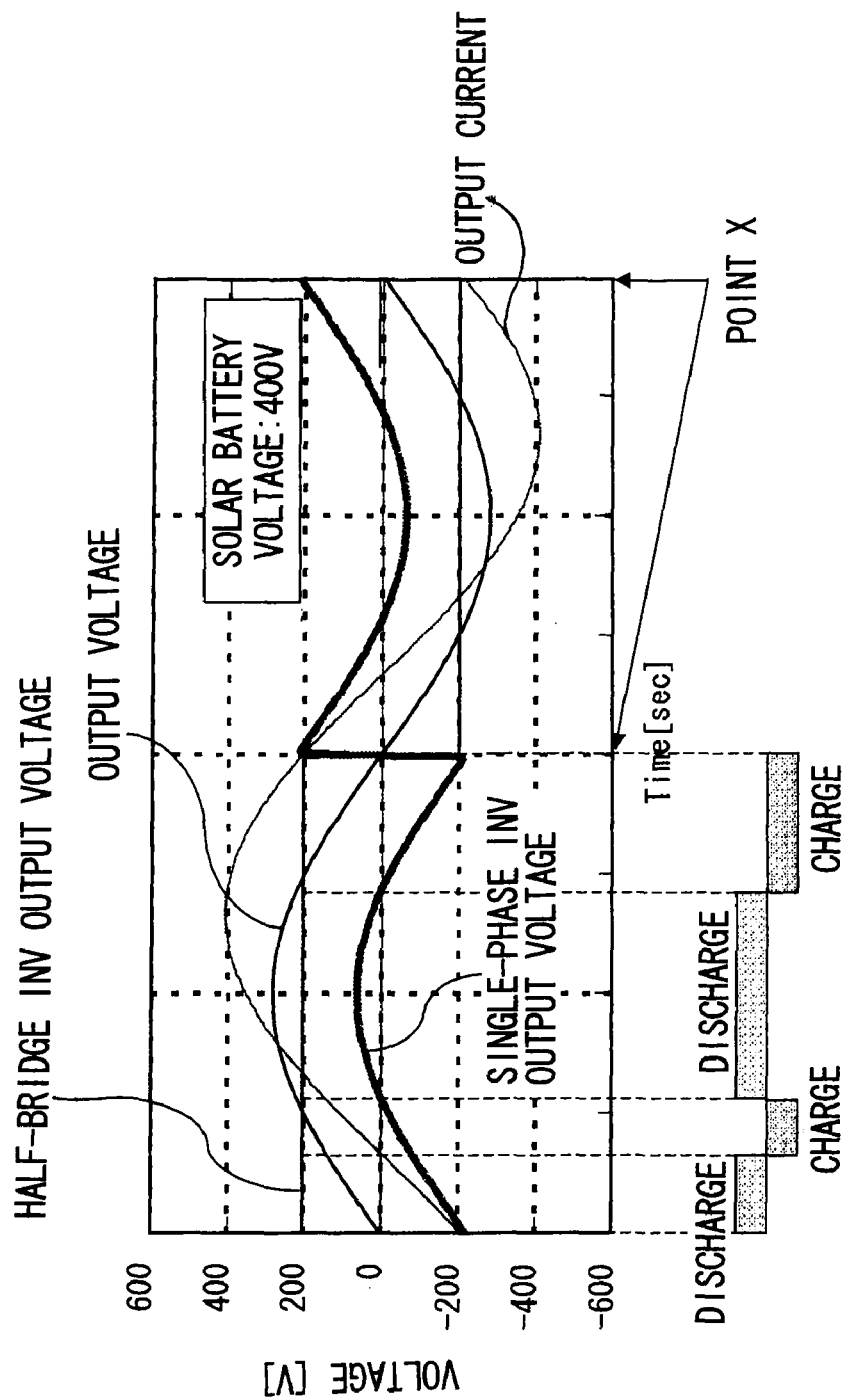
FIG. 5 is a diagram of voltage waveforms showing operation of the three-phase power converting apparatus according to the second embodiment of the present invention.

Since the phases of the output currents are advanced by 30 degrees from those of the output voltages in this case, each of the single-phase inverters 5a, 5c is operated to discharge the capacitor 52 approximately from 0 degrees to 30 degrees and approximately from 55 degrees to 145 degrees in a range of phase of 0 to $\pi$ and each of the single-phase inverters 5a, 5c charges the capacitor 52 in other than this range as shown in FIG. 5.

If the output voltage of the three-phase power converting apparatus is 200 VAC and the DC voltage of the half-bridge inverters 4a-4c (i.e. the voltage of the solar battery 1) is 450 VDC, for example, the amounts of electric power supplied to and demanded by the single-phase inverters 5a, 5c are balanced during a half cycle and, thus, become approximately zero as a whole. When the DC voltage of the half-bridge inverters 4a, 4c varies, however, the amounts of electric power supplied to and demanded every half cycle by the single-phase inverters 5a, 5c which are controlled by the PWM control operation to make up for an insufficiency of the output voltages of the half-bridge inverters 4a, 4c go out of balance. As a consequence, it becomes necessary to supply positive and negative quantities of electric power to the capacitors 52 of the single-phase inverters 5a, 5c. Nevertheless, because the DC/DC converter 8 is connected between the two capacitors 6a, 6b which constitute the DC portion of the half-bridge inverters 4a, 4c and the capacitors 52 which constitute a DC portion of the single-phase inverters 5a, 5c, it is possible to exchange necessary electric power between the capacitors 6a, 6b and the capacitors 52.

Figure 6:
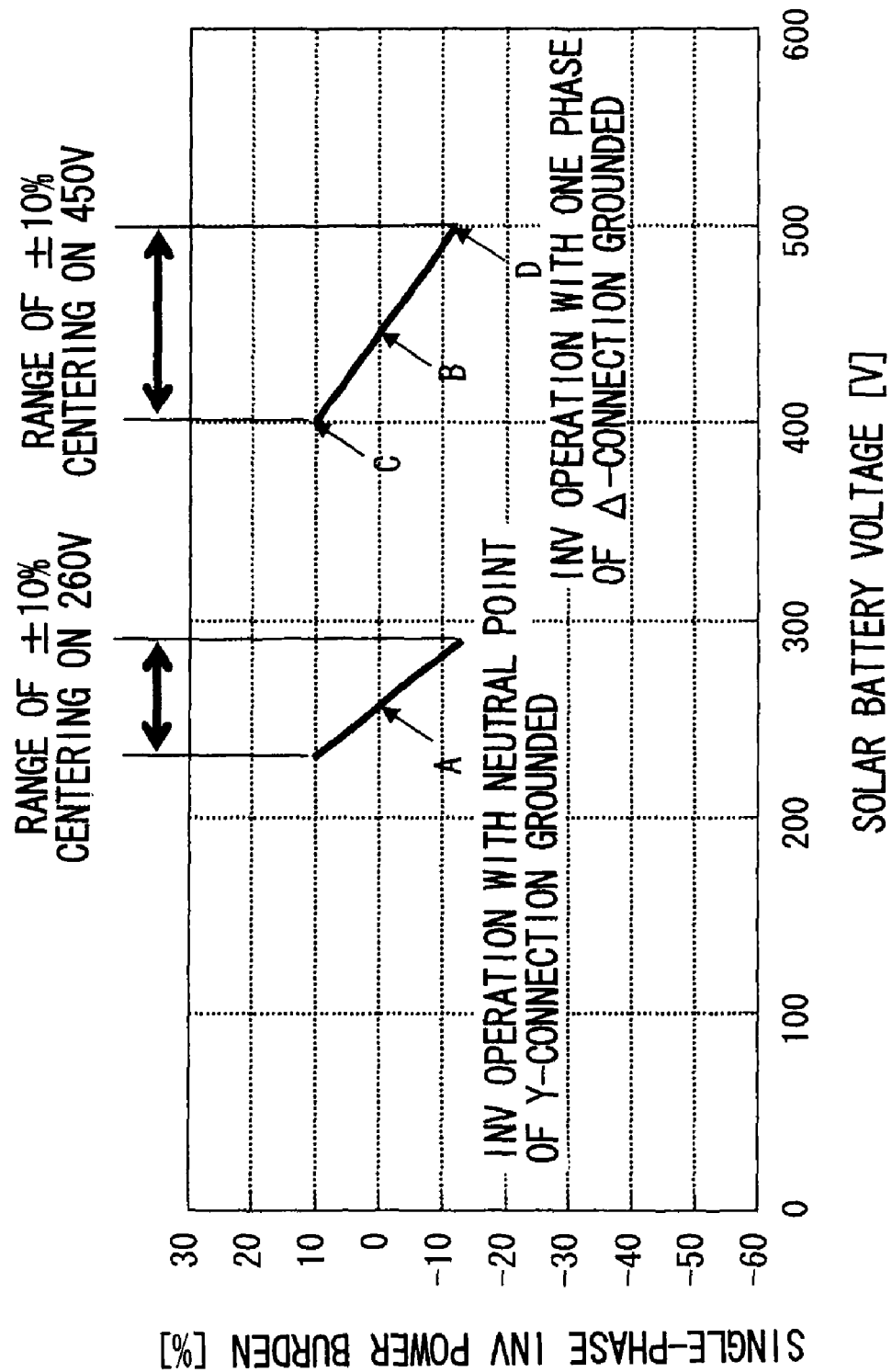
FIG. 6 is a diagram showing a relationship between voltage of a solar battery and a power burden born by single-phase inverters according to the first embodiment of the present invention.

Shown in FIG. 6 is a relationship between the DC voltage of the half-bridge inverters 4a, 4c, or the voltage of the solar battery 1, and electric power (power burden) handled by the single-phase inverters 5a, 5c, or the electric power handled by the DC/DC converter 8 under conditions where the output voltage of the three-phase power converting apparatus is 200 VAC. It is to be noted that FIG. 6 shows a characteristic of the foregoing first embodiment shown in FIG. 3 as well for the sake of comparison.

When the voltage of the solar battery 1 is 450 V (point B in the Figure), the total amount of electric power supplied to and demanded by the single-phase inverters 5a, 5c every half cycle is approximately zero, that is, the power burden is approximately 0 as discussed above. It the solar battery voltage rises from this point B, the single-phase inverters 5a, 5c receive electric power on average. If the solar battery voltage drops from this point B, on the other hand, the single-phase inverters 5a, 5c supply electric power on average.

When temperature variations are taken into consideration, the amount of variations in the output voltage of the solar battery 1 falls within a range of approximately ±10%, so that electric power required at present by the single-phase inverters 5a-5c is to be exchanged through the DC/DC converter 8.

As shown in FIG. 6, the amount of variations in the output voltage of the solar battery 1 falls within the range of approximately ±10%, so that the electric power handled by the single-phase inverters 5a, 5c also becomes approximately ±10% of output power. Specifically, since the electric power-handled by the DC/DC converter 8 is approximately ±10% of total electric power, the DC/DC converter 8 is of a compact size and low cost and, thus, a loss produced by the DC/DC converter 8 has little influence which is of a negligible level.

As seen above, the DC/DC converter 8 is connected between the two capacitors 6a, 6b which constitute the DC portion of the half-bridge inverters 4a-4c and the capacitors 52 which constitute the DC portion of the single-phase inverters 5a-5c in this embodiment as well so that the necessary electric power can be exchanged between the capacitors 6a, 6b and the capacitors 52. Although only the single-phase inverters 5a, 5c among the three single-phase inverters 5a-5c perform operation for generating voltages in this case, it is possible to stabilize the DC voltage of the single-phase inverters 5a, 5c and output a stable AC voltage to the power system 2a by exchanging the electric power through the DC/DC converter 8 regardless of variations in the output voltage of the solar battery 1. Also, since the DC/DC converter 8 is of a compact size and low cost and the influence of the loss thereof is almost negligible, the provision of the DC/DC converter 8 does not produce adverse effects on the entirety of three-phase power converting apparatus. Accordingly, the converting efficiency is improved and the apparatus structure which has been made even more compact and still less costly makes it possible to obtain a stable output with higher reliability as discussed above.

Figure 7:
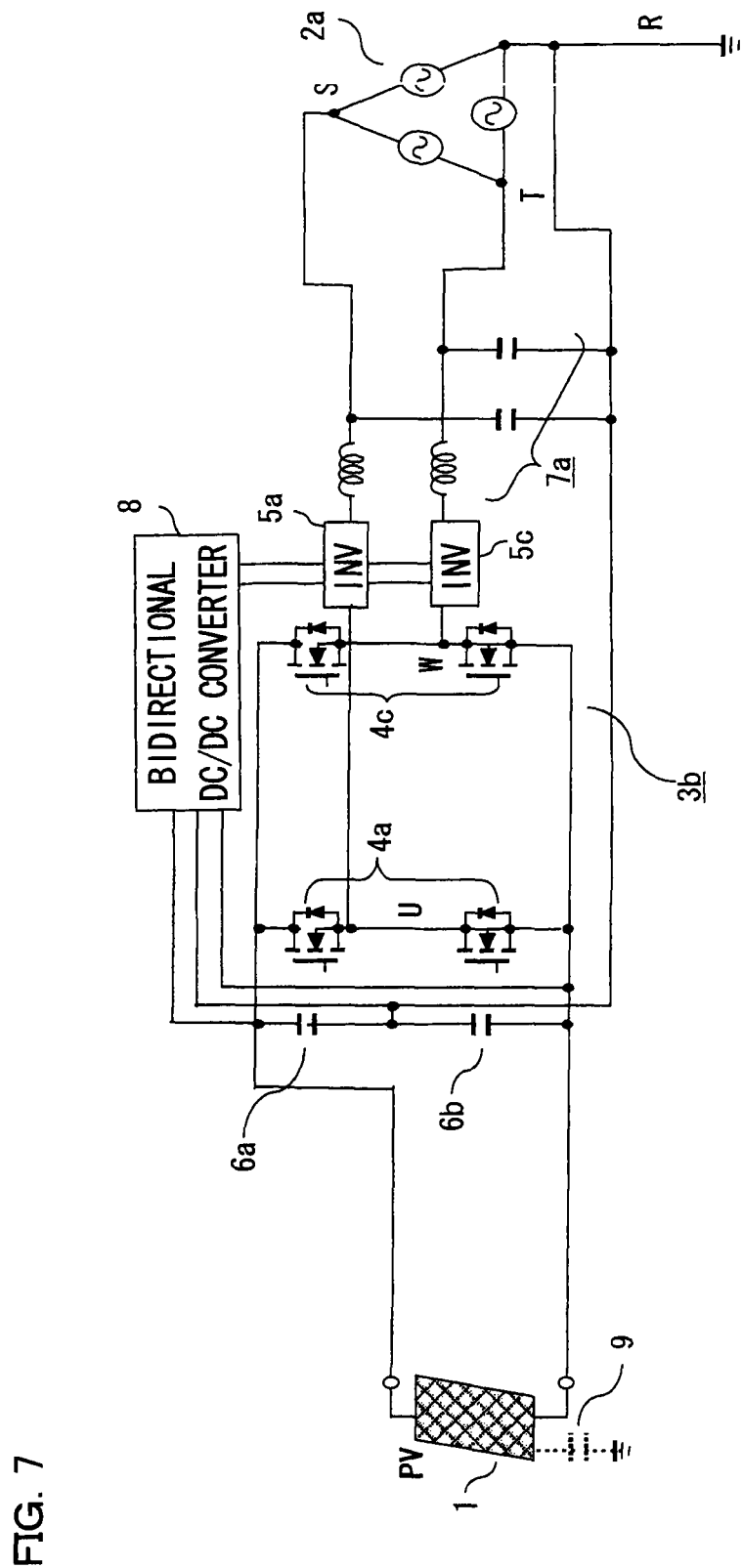
FIG. 7 is a circuit diagram showing the configuration of a three-phase power converting apparatus according to a variation of the second embodiment of the present invention.

While the half-bridge inverter 4b and the single-phase inverter 5b of the V phase are controlled not to perform the operation for generating voltages in this second embodiment using the inverter circuit 3a including the same three sets each of half-bridge inverters 4a-4c and single-phase inverters 5a-5c as in the first embodiment, the three-phase power converting apparatus may be modified to use an inverter circuit 3b including two sets each of half-bridge inverters 4a, 4c and single-phase inverters 5a, 5c as shown in FIG. 7. In this case, filter circuits 7a are provided at an output side of the single-phase inverters 5a, 5c for two phases, and the intermediate point of the two series-connected capacitors 6a, 6b is connected to a connecting point of the filter circuits 7a of individual phases that corresponds to a neutral point of AC outputs from the single-phase inverters 5a, 5c and to the grounded R phase of the power system 2a. Operation in this case is also the same as in the above-described second embodiment.

Third Embodiment

The foregoing second embodiment is configured such that each of the half-bridge inverters 4a, 4c is operated to output one pulse per half cycle, that is, to output one pulse of voltage of which pulsewidth corresponds to a half cycle. The single-phase inverters 5a, 5c are required to output voltage differences between the output voltage of the three-phase power converting apparatus and the output voltages of the respective half-bridge inverters 4a, 4c and the level of each of the output voltages of the half-bridge inverters 4a, 4c is one half the DC voltage of the half-bridge inverters 4a, 4c. Therefore, the level of each of the output voltages of the single-phase inverters 5a, 5c also becomes equal to one half the DC voltage of the half-bridge inverters 4a, 4c at a point X where the output voltage of the three-phase power converting apparatus is zero (refer to FIG. 5). When the voltage of the solar battery 1 rises and the DC voltage of the half-bridge inverters 4a, 4c increases, the voltages of the single-phase inverters 5a, 5c also increase at the same time. Therefore, it is necessary to design the three-phase power converting apparatus such that a high DC voltage is supplied to the single-phase inverters 5a, 5c.

Figure 8:
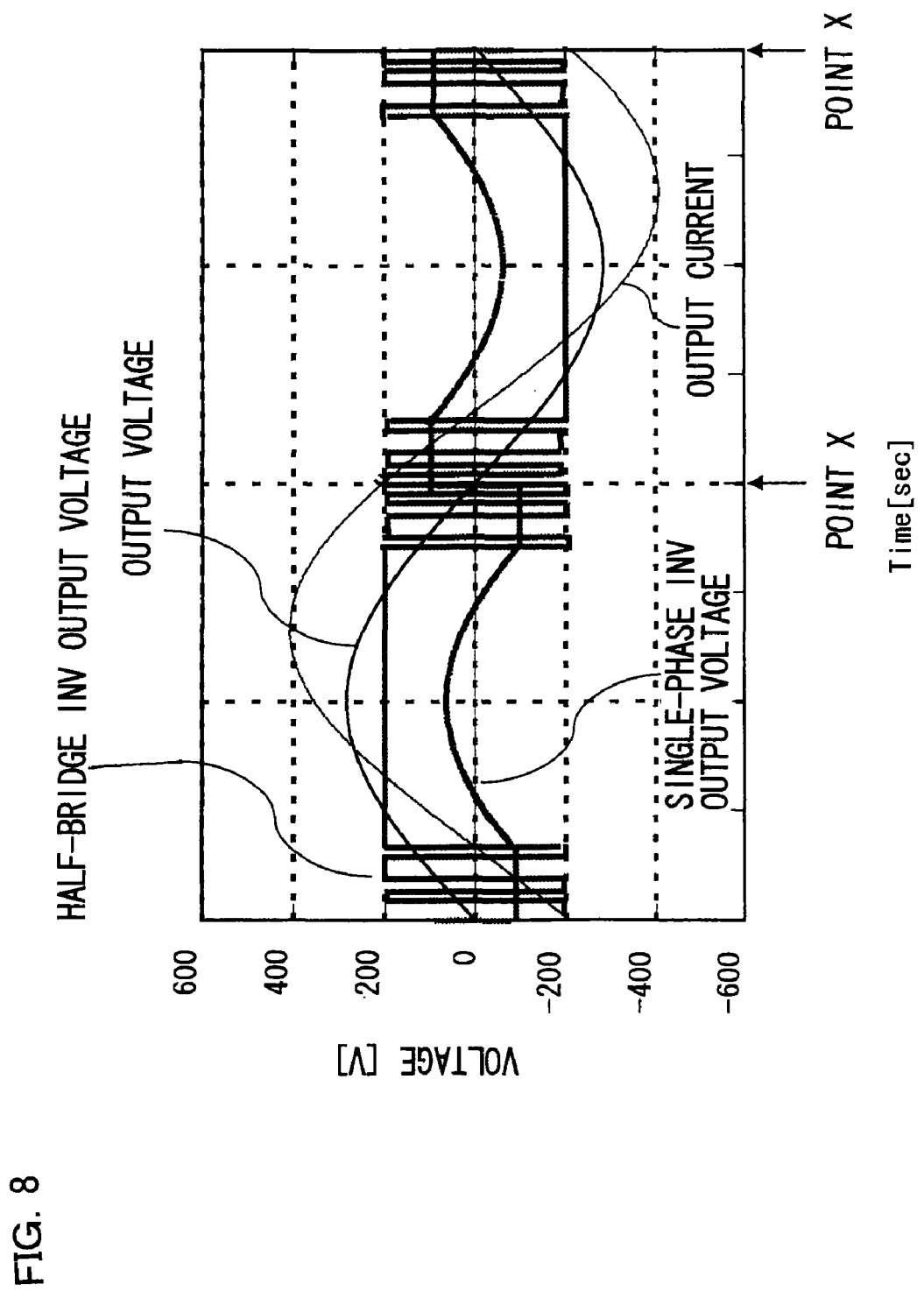
FIG. 8 is a diagram of voltage waveforms showing operation of a three-phase power converting apparatus according to a third embodiment of the present invention.

Described below in this third embodiment based on operating voltage waveforms shown in FIG. 8 is a case in which the half-bridge inverters 4a, 4c operate in a different way in the vicinity of each zero point of the system voltage. Incidentally, the three-phase power converting apparatus has the same circuit configuration as in the foregoing second embodiment.

As shown in FIG. 8, the two sets of half-bridge inverters 4a, 4c generate voltages of both polarities centering on zero level, in which a width between the voltages of both polarities (i.e., a difference between the positive and negative voltages) matches the level of the voltage of the solar battery 1, that is, a DC input voltage which is 400 V in this case. Here, each of the half-bridge inverters 4a, 4c is controlled by the PWM control operation during each period in the vicinity of the point X at which the system voltage is zero and is caused to output one pulse of voltage having a pulsewidth corresponding to each period in other than the period of the PWM control operation every half cycle of the system voltage. Specifically, each of the half-bridge inverters 4a, 4c is caused to output one pulse of voltage of which pulsewidth is approximately a half cycle and is controlled by the PWM control operation only in the vicinity of the point X. Then, each of the single-phase inverters 5a, 5c is controlled by the PWM control operation to make up for a voltage insufficiency from the aforementioned system voltage.

If the level of each of the output voltages of the half-bridge inverters 4a, 4c is lowered by controlling the half-bridge inverters 4a, 4c by the PWM control operation in the vicinity of each point X as mentioned above, it is possible to lower the level of each of the output voltages of the single-phase inverters 5a, 5c as well. Consequently, it is not necessary to design the three-phase power converting apparatus such that a high DC voltage is supplied to the single-phase inverters 5a, 5c. This makes it possible to prevent a cost increase. Also, since the half-bridge inverters 4a, 4c are operated by the PWM control operation only in the vicinity of each point X, an increase in switching loss is so little that a resultant influence to the efficiency of the three-phase power converting apparatus is negligible. Also, since the DC voltage supplied to the single-phase inverters 5a, 5c can be reduced, it is possible to choose devices which operate at a low voltage. This serves to reduce losses occurring during ON periods of the devices, thereby increasing the efficiency of the three-phase power converting apparatus.

Incidentally, the period in which the half-bridge inverters 4a, 4c are operated by the PWM control operation is set at a period covering a range of phase of ±30 degrees from each point X at which the system voltage is zero. If this period exceeds the ±30-degree range, the number of switching of each of the half-bridge inverters 4a, 4c becomes so large that the switching loss increases, resulting in a reduction in efficiency.

Also, although a peak-to-peak value between the maximum and minimum voltage values of the system voltage is larger than the voltage of the solar battery 1 in this embodiment as in the foregoing second embodiment, it is possible to output a voltage higher than the voltage of the solar battery 1 with no need for a voltage boosting circuit. It is also possible to reduce the capacity of each filter circuit 7 provided in a succeeding stage. This serves to make the apparatus structure compact and less costly and achieve improved converting efficiency.

While the foregoing discussion of the present embodiment has illustrated a case in which electric power is supplied from the three-phase power converting apparatus to the power system 2a having the delta-connected configuration of which one phase is grounded, the embodiment is also applicable to a case in which the three-phase power converting apparatus supplies electric power to the power system 2 having the Y-connected configuration of which neutral point is grounded as illustrated in the first embodiment. In essence, by operating the three sets of half-bridge inverters 4a-4c by the PWM control operation in each period in the vicinity of the point X at which the system voltage is zero, it is possible to lower the level of each of the output voltages of the single-phase inverters 5a-5c in the vicinity of the point X and thus lower the DC voltage supplied to the single-phase inverters 5a-5c.

Fourth Embodiment

While the foregoing third embodiment has illustrated an arrangement in which the half-bridge inverters 4a, 4c are operated by the PWM control operation in the vicinity of each zero point of the system voltage, a three-phase power converting apparatus selects one of two kinds of control modes and uses the selected control mode in the present embodiment.

As regards control operation of the three-phase power converting apparatus, a mode of operation performed in the same way as in the foregoing second embodiment is referred to as a first control mode and a mode of operation performed in the same way as in the foregoing third embodiment is referred to as a second control mode. Specifically, in the first control mode, each of the half-bridge inverters 4a, 4c is caused to output one pulse of voltage of which pulsewidth corresponds to a half cycle every half cycle of the system voltage, and each of the single-phase inverters 5a, 5c is controlled by the PWM control operation to make up for a voltage insufficiency from the system voltage. Then, in the second control mode, each of the half-bridge inverters 4a, 4c is controlled by the PWM control operation during each period in the vicinity of the point at which the system voltage is zero and is caused to output one pulse of voltage having a pulsewidth corresponding to each period in other than the period of the PWM control operation every half cycle of the system voltage, and each of the single-phase inverters 5a, 5c is controlled by the PWM control operation to make up for the voltage insufficiency from the system voltage. Here again, the period in which each of the half-bridge inverters 4a, 4c is operated by the PWM control operation is set at the period covering the range of phase of ±30 degrees from each point X at which the system voltage is zero.

Provided with such two kinds of control modes and means for switching these control modes, the three-phase power converting apparatus selects the first control mode if the output voltage of the solar battery 1 is equal to or lower than a specific voltage, and selects the second control mode if the output voltage of the solar battery 1 exceeds the specific voltage. The specific voltage used as a threshold value for control mode switching is set at a level lower than a value twice as high as the DC voltage supplied to the single-phase inverters 5a, 5c.

Since the level of each of the output voltages of the half-bridge inverters 4a, 4c is always equal to one half the DC voltage of the half-bridge inverters 4a, 4c in the first control mode, the level of each of the output voltages of the single-phase inverters 5a, 5c also becomes equal to one half the DC voltage of the half-bridge inverters 4a, 4c (refer to FIG. 5). When the output voltage of the solar battery 1 increases and one half the DC voltage of the half-bridge inverters 4a, 4c exceeds the output voltages of the single-phase inverters 5a, 5c in this first control mode, it becomes impossible for each of the single-phase inverters 5a, 5c to output a voltage for making up for the voltage insufficiency from the system voltage during each period in the vicinity of the point at which the system voltage is zero.

Here, when the output voltage of the solar battery 1 exceeds the specific voltage before the output voltage of the solar battery 1 matches the value twice as high as the DC voltage supplied to the single-phase inverters 5a, 5c, the three-phase power converting apparatus is switched to the second control mode. This means that the control mode is switched before one half the DC voltage supplied to the half-bridge inverters 4a, 4c matches the DC voltage supplied to the single-phase inverters 5a, 5c, and each of the half-bridge inverters 4a, 4c is controlled by the PWM control operation in each period in the vicinity of the point at which the system voltage is zero. This makes it possible to lower the level of each of the output voltages of the half-bridge inverters 4a, 4c as well as the level of each of the output voltages of the single-phase inverters 5a, 5c. For this reason, it is possible to control the single-phase inverters 5a, 5c for making up for the voltage insufficiency from the system voltage with high accuracy.

As thus far discussed, the three-phase power converting apparatus is switched between the two kinds of control modes and the half-bridge inverters 4a, 4c are controlled by the PWM control operation where necessary in the present embodiment. It is therefore possible to realize power converting operation with greater efficiency.

The present embodiment is also applicable to a case in which the three-phase power converting apparatus supplies electric power to the power system 2 having the Y-connected configuration of which neutral point is grounded as illustrated in the foregoing first embodiment, yet obtaining the same advantageous effects.

Fifth Embodiment

Figure 9:
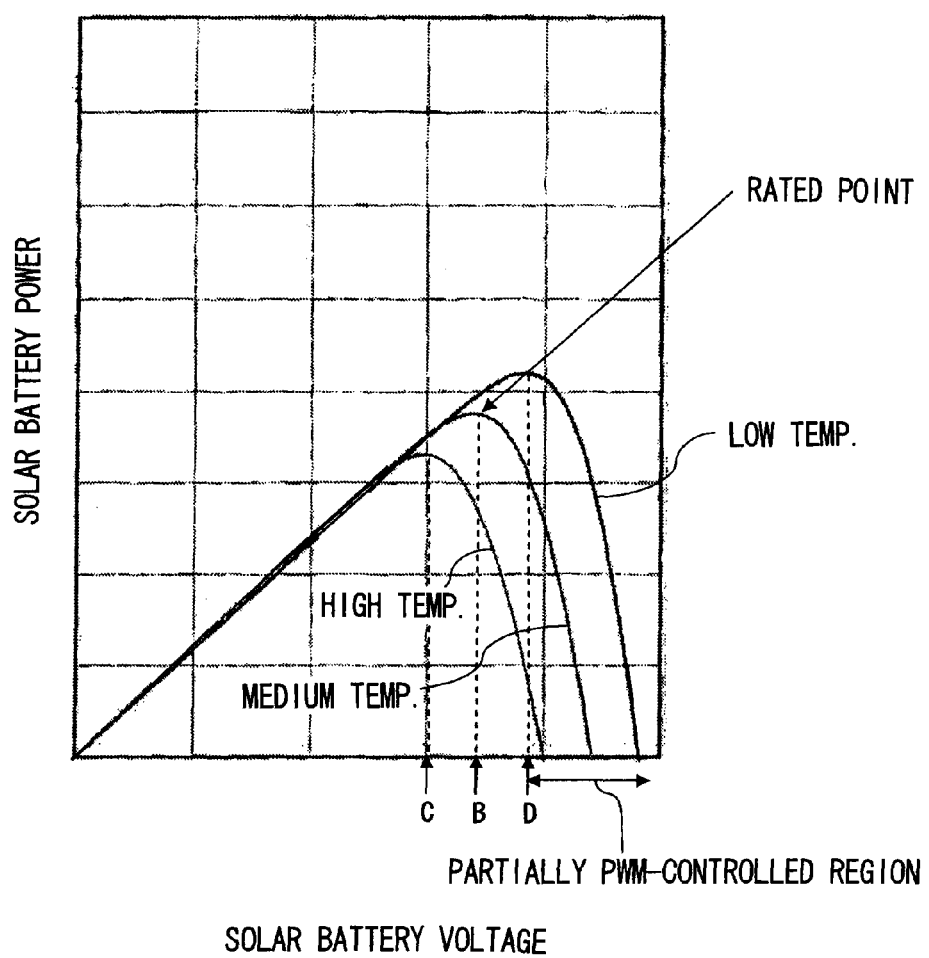
FIG. 9 is a characteristic diagram of the solar battery according to a fifth embodiment of the present invention.

In a case where the three-phase power converting apparatus supplies electric power to the power system 2a having the delta-connected configuration of which one phase is grounded, the total amount of electric power supplied to and demanded by the single-phase inverters 5a, 5c every half cycle is approximately zero when the voltage of the solar battery 1 is at point B as shown in FIG. 6, in which point C indicates a state where the output voltage is decreased by 10% due to an increase in temperature and point D indicates a state where the output voltage is increased by 10% due to a decrease in temperature. As previously mentioned, a range of variations in the output voltage of the solar battery 1 is approximately ±10%, that is, within a range from the point C to the point B and from the point B to the point D. Described below with reference to operating characteristics of the solar battery 1 shown in FIG. 9 is how voltages of the solar battery 1 at the individual points are set.

A rated voltage of the solar battery 1 is defined in such a manner that a point of the rated voltage of the solar battery 1 matches the point B, or the power burden born by the single-phase inverters 5*a*, 5*c* every half cycle becomes approximately zero under nominal output conditions at a medium temperature of the solar battery 1. The three-phase power converting apparatus is designed such that an operating point of the solar battery 1 in a maximum power state under high temperature conditions where the temperature of the solar battery 1 has increased matches the point D and an operating point of the solar battery 1 in a maximum power state under low temperature conditions where the temperature of the battery has decreased matches the point C.

With this arrangement, the electric power handled by the DC/DC converter 8 which is connected between the two capacitors 6*a*, 6*b* constituting the DC portion of the half-bridge inverters 4*a*, 4*c* and the capacitors 52 constituting the DC portion of the single-phase inverters 5*a*, 5*c* for bidirectionally transferring the electric power becomes zero under nominal output conditions of the solar battery 1. It is therefore possible to prevent a reduction in efficiency due to losses caused by the DC/DC converter 8. As a result, it is possible to realize a three-phase power converting apparatus featuring high efficiency.

Incidentally, if the control mode is switched when the output voltage of the solar battery 1 becomes higher than the voltage at the point D and the half-bridge inverters 4*a*, 4*c* are operated by the PWM control operation during each period in the vicinity of the point at which the system voltage is zero by applying the foregoing fourth embodiment, it is possible to prevent an increase in the DC voltage required by the single-phase inverters 5*a*, 5*c*.

If it is desired to lower the DC voltage supplied to the single-phase inverters 5*a*, 5*c*, the half-bridge inverters 4*a*, 4*c* are to be operated by the PWM control operation in a voltage range lower higher than the voltage at the point D as well.

The embodiment is similarly applicable to a case where the three-phase power converting apparatus supplies electric power to the power system 2 having the Y-connected configuration of which neutral point is grounded. Specifically, it is possible to prevent a reduction in efficiency due to losses caused by the DC/DC converter 8 by defining the rated voltage of the solar battery 1 such that the power burden born by the single-phase inverters 5*a*-5*c* every half cycle becomes approximately zero under the nominal output conditions of the solar battery 1.

Sixth Embodiment

The foregoing first embodiment illustrated the three-phase power converting apparatus connected to the power system 2 having the Y-connected configuration of which neutral point is grounded and the foregoing second embodiment illustrated the three-phase power converting apparatus connected to the power system 2*a* having the delta-connected configuration of which one phase is grounded. Described in this embodiment is a three-phase power converting apparatus which is applicable to either of the two kinds of power systems 2, 2*a* with connections of one apparatus made changeable.

Figure 10:
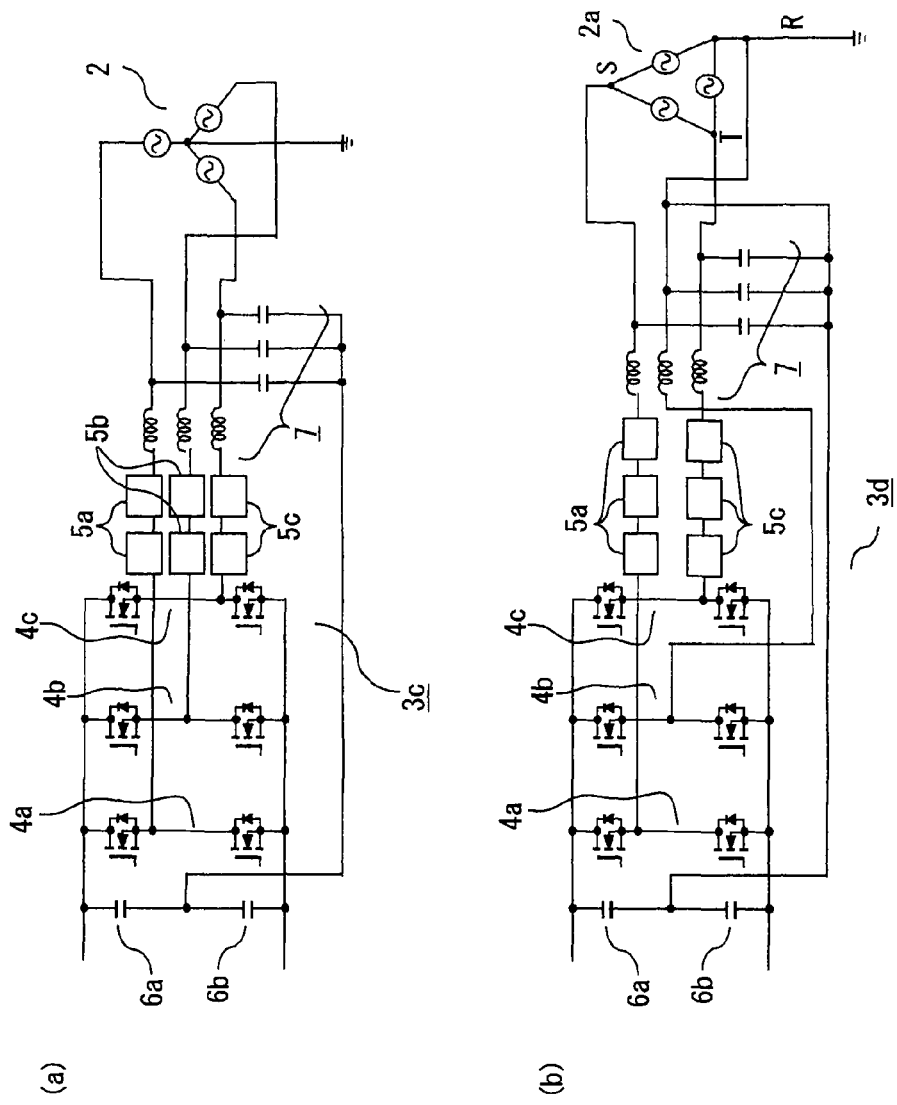
FIG. 10 is a circuit diagram showing the configuration of a three-phase power converting apparatus according to a sixth embodiment of the present invention.

FIGS. 10(*a*) and 10(*b*) are circuit diagrams showing the configuration of the three-phase power converting apparatus according to a sixth embodiment of the present invention, FIG. 10(*a*) representing a case in which the three-phase power converting apparatus is connected to the power system 2 having the Y-connected configuration of which neutral point is grounded and FIG. 10(*b*) representing a case in which the three-phase power converting apparatus is connected to the power system 2*a* having the delta-connected configuration of which one phase is grounded.

As shown in FIG. 10(*a*), the three-phase power converting apparatus is provided with an inverter circuit 3*c* including three sets of half-bridge inverters 4*a*-4*c*, each of which is made up of two series-connected switching devices, and single-phase inverters 5*a*-5*c* which are connected in series with individual AC output lines of the three sets of half-bridge inverters 4*a*-4*c*, respectively, the single-phase inverters 5*a*-5*c* including a plurality of series-connected single-phase inverters 5*a*, a plurality of series-connected single-phase inverters 5*b* and a plurality of series-connected single-phase inverters 5*c*. In this case, series circuits of two each of the single-phase inverters 5*a*, 5*b* and 5*c* each constitute a single-phase inverter of one phase, and output terminals of these single-phase inverters are connected to respective phases of the power system 2. Designated by 6*a*, 6*b* and 7 are the same elements as shown in FIG. 1. Although not illustrated, a DC/DC converter 8 is provided between the two capacitors 6*a*, 6*b* and a DC portion of the single-phase inverters 5*a*-5*c* to allow bidirectional exchange of electric power. Also, a connecting point of the filter circuits 7 of the individual phases corresponding to the neutral point of three-phase AC outputs is connected to a connecting point of the two capacitors 6*a*, 6*b*.

When connecting the three-phase power converting apparatus thus configured to the power system 2*a* having the delta-connected configuration of which one phase is grounded as shown in FIG. 10(*b*), the single-phase inverters 5*b* connected to the grounded phase (R phase) of the power system 2*a* are disconnected from the R phase separated from each other and the same number each of the single-phase inverter(s) 5*b* is connected to each of the other two phases, or the S phase and the T phase. Here, since two each of the single-phase inverters 5*a*, 5*b* and 5*c* are connected to each phase in FIG. 10(*a*), three each of the single-phase inverters 5*a* and 5*c* are connected to each of the S phase and the T phase in FIG. 10(*b*). As a result, there is obtained an inverter circuit 3*d* including two sets of half-bridge inverters 4*a*, 4*c*, each of which is made up of the two series-connected switching devices, and the single-phase inverters 5*a*, 5*c* which are connected in series with the individual AC output lines of the two sets of half-bridge inverters 4*a*, 4*c*, respectively. In this case, series circuits of the three each single-phase inverters 5*a* and 5*c* each constitute a single-phase inverter of one phase, and output terminals of these single-phase inverters are connected to the ungrounded S and T phases of the power system 2. Then, the connecting point of the two capacitors 6*a*, 6*b* which has been connected to the connecting point of the filter circuits 7 of the individual phases is also connected to the grounded phase (R phase) of the power system 2*a*.

The single three-phase power converting apparatus is made configurable in two kinds of connecting states shown in FIGS. 10(*a*) and 10(*b*) by changing the connections as discussed above. This makes it possible to apply the single three-phase power converting apparatus to the differently configured power systems 2 and 2*a* so that the apparatus can be widely applied, thereby contributing to a cost reduction. Also, it is possible to obtain the same advantageous effects as the foregoing first to fifth embodiments by additionally applying the individual embodiments.

While the output voltage of the solar battery 1 is used as the DC input voltage of the three-phase power converting apparatus in each of the foregoing embodiments, a voltage fed from other DC power sources may be used as the DC input voltage.

Seventh Embodiment

Figure 11:
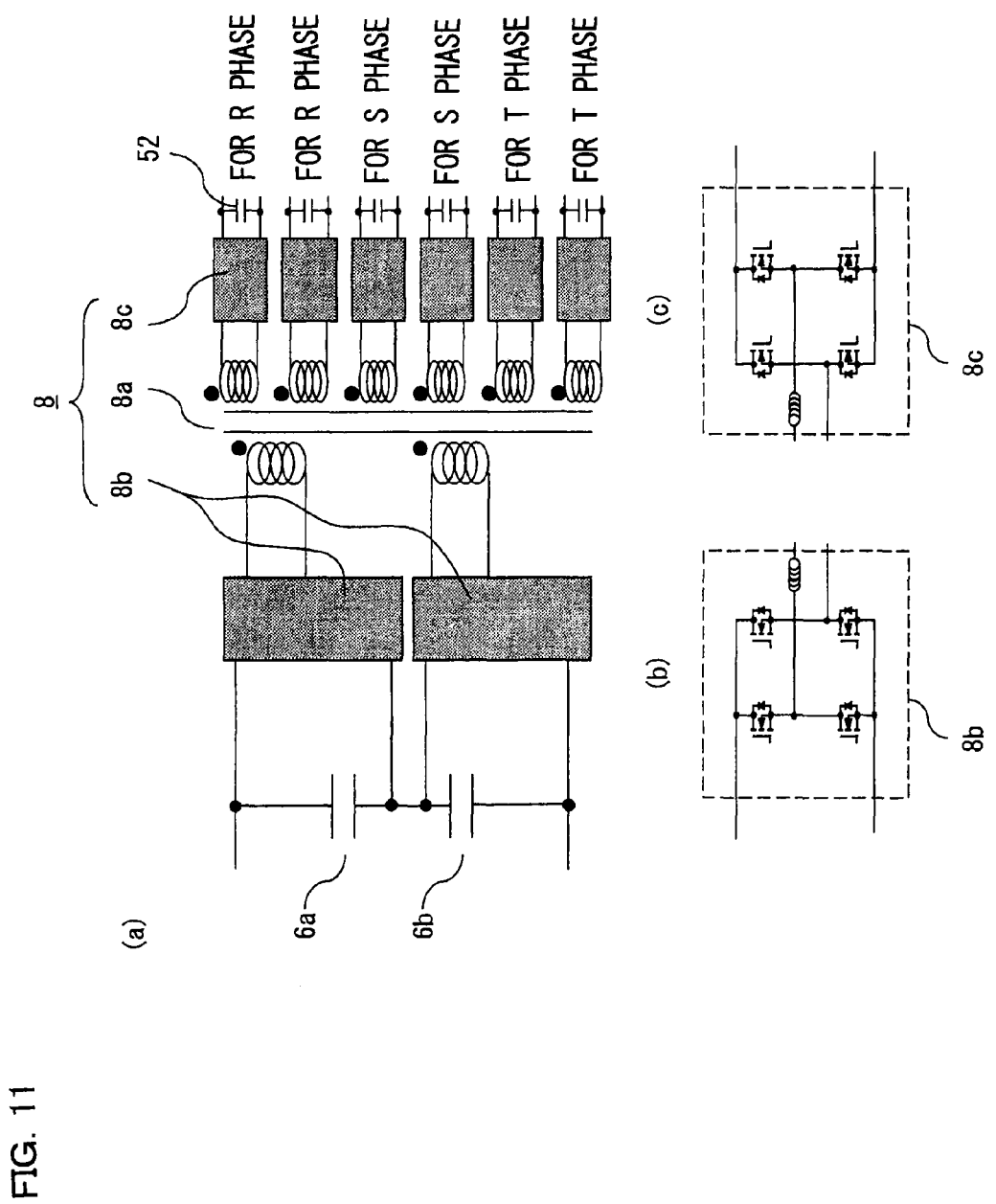
FIG. 11 is a circuit diagram showing the configuration of a DC/DC converter according to a seventh embodiment of the present invention.

FIG. 11(a) is a diagram showing an example of a DC/DC converter 8 adapted to the configuration of the three-phase power converting apparatus according to the foregoing sixth embodiment. As shown in the Figure, the DC/DC converter 8 connected between the two capacitors 6a, 6b and capacitors 52 which constitute DC portions of two each per phase of single-phase inverters 5a, 5b and 5c to allow bidirectional exchange of electric power is configured with one transformer 8a, full-bridge inverters 8b provided on a side of the two capacitors 6a, 6b and full-bridge inverters 8c provided on a side of the six capacitors 52. FIGS. 11(b) and 10(c) show the configurations of the full-bridge inverters 8b, 8c, respectively. Currents flow in two opposite directions according to the levels of voltages generated by the individual full-bridge inverters 8b, 8c on an AC side (transformer side), and voltages of which values are proportional to a ratio of the numbers of turns of the transformer 8a are obtained from the individual DC portions. Therefore, voltages of the capacitors 6a, 6b divided in halves for the DC portions of the half-bridge inverters 4a-4c also become proportional to the ratio of the numbers of turns of the transformer 8a. Thus, if the numbers of turns of two windings on the side of the capacitors 6a, 6b are matched with each other, a voltage at a junction point is stabilized at a middle point of the DC voltages of the half-bridge inverters 4a-4c.

Figure 12:
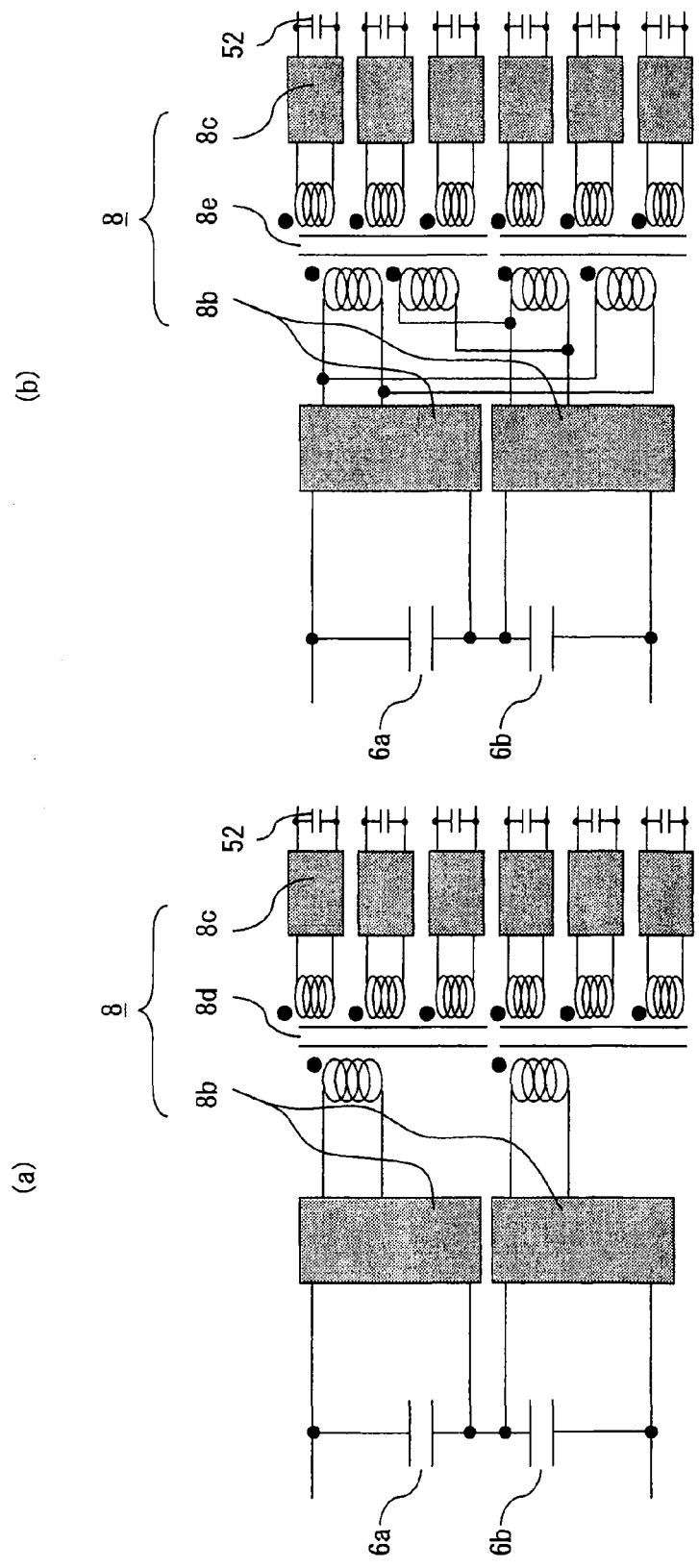
FIG. 12 is a circuit diagram showing the configuration of a DC/DC converter according to a variation of the seventh embodiment of the present invention.

Incidentally, the DC/DC converter 8 may be configured as shown in FIG. 12(a) or 12(b). In FIG. 12(a), a transformer 8d is divided into two parts. Since the transformer 8d is simplified in this configuration, it is possible to achieve a cost reduction. Also, in FIG. 12(b), outputs of the full-bridge inverters 8b on the side of the capacitors 6a, 6b are connected to both of two transformers 8e. Therefore, if the numbers of turns of the two windings on the side of the capacitors 6a, 6b are matched with each other, the voltage at the junction point is stabilized at the middle point of the DC voltage of the half-bridge inverters 4a-4c. Also, since the transformers 8e are simplified in this configuration, it is possible to achieve a cost reduction.

INDUSTRIAL APPLICABILITY

The invention can be applied to a system interconnection apparatus like a power conditioner for connecting a distributed power generation source to a power system.

The invention claimed is:

1. A power converting apparatus comprising:
two sets of half-bridge inverters connected between positive and negative terminals of a DC power supply, each set of half-bridge inverters including two series-connected switching devices;
single-phase inverters connected in series with individual AC output lines of said two sets of half-bridge inverters; and
two series-connected capacitors for dividing a voltage of said DC power supply which is a DC input of said half-bridge inverters, wherein,
output terminals of said individual single-phase inverters are connected to two ungrounded phases of a three-phase power system of which one phase is grounded, an intermediate point of said two series-connected capacitors is connected to a neutral point of AC outputs from said single-phase inverters of said two phases, and the intermediate point is connected to the one grounded phases of said power system, and
each of said half-bridge inverters is caused to output voltage pulses of which frequency is same to that of a system voltage and said individual single-phase inverters are controlled by PWM control operation to make up for a voltage insufficiency from the system voltage.

2. The power converting apparatus as recited in claim 1 wherein each of said half-bridge inverters is controlled by the PWM control operation during each period in the vicinity of a point at which the system voltage is zero and is caused to output one pulse of voltage having a pulsewidth corresponding to each period in other than the period of the PWM control operation every half cycle of the system voltage.

3. The power converting apparatus as recited in claim 1 wherein said power converting apparatus includes:
a first control mode in which each of said half-bridge inverters is caused to output one pulse of voltage of which pulsewidth corresponds to the half cycle every half cycle of the system voltage and said individual single-phase inverters are controlled by the PWM control operation to make up for the voltage insufficiency from the system voltage;
a second control mode in which each of said half-bridge inverters is caused to output one pulse of voltage and is controlled by PWM control operation in regions of both edges of the pulse every half cycle of the system voltage, and said individual single-phase inverters are controlled by the PWM control operation to make up for the voltage insufficiency from the system voltage; and
means for selecting the first control mode if the voltage of said DC power supply is equal to or lower than a specific voltage, and selecting the second control mode if the voltage of said DC power supply exceeds the specific voltage.

4. The power converting apparatus as recited in claim 3 wherein the specific voltage is set at a level lower than a value twice as high as a DC input voltage of said single-phase inverters.

5. The power converting apparatus as recited in claim 1 wherein the voltage of said DC power supply is lower than a peak-to-peak value between maximum and minimum values of a phase voltage of said power system.

6. The power converting apparatus as recited in claim 1 wherein said DC power supply is a solar battery.

7. The power converting apparatus as recited in claim 6 wherein a rated voltage of said solar battery is defined in such a manner that a power burden born by said single-phase inverters every half cycle of the system voltage becomes zero at a point of the rated voltage of said solar battery.

8. The power converting apparatus as recited in claim 1 further comprising:
a DC/DC converter between an input DC portion of said individual single-phase inverters and said two series-connected capacitors for bidirectionally transferring electric power.

9. A power converting apparatus comprising:
three sets of half-bridge inverters connected between positive and negative terminals of a DC power supply, each set of half-bridge inverters including two series-connected switching devices;
plural sets of single-phase inverters connected in series with individual AC output lines of said three sets of half-bridge inverters, each set of single-phase inverters including a plurality of series-connected single-phase inverters;

first connecting means for connecting the output terminals of said individual single-phase inverters to individual phases of a three-phase power system; and second connecting means for disconnecting said plurality of single-phase inverters of one phase from the relevant phase and connecting the same number of single-phase inverters to the AC output lines of the other two phases, and connecting the individual AC output lines of the two phases to two phases of a three-phase power system other than one phase thereof which is grounded, wherein said power converting apparatus is configured to permit switching from said first connecting means to said second connecting means, each of said half-bridge inverters is caused to output voltage pulses of which frequency is same to that of a system voltage, and said individual single-phase inverters are controlled by PWM control operation to make up for a voltage insufficiency from the system voltage.

10. The power converting apparatus as recited in claim 9 wherein each of said half-bridge inverters is controlled by the PWM control operation during each period in the vicinity of a point at which the system voltage is zero and is caused to output one pulse of voltage having a pulsewidth corresponding to each period in other than the period of the PWM control operation every half cycle of the system voltage.

11. The power converting apparatus as recited in claim 9 wherein said power converting apparatus includes:
a first control mode in which each of said half-bridge inverters is caused to output one pulse of voltage of which pulsewidth corresponds to the half cycle every half cycle of the system voltage and said individual single-phase inverters are controlled by the PWM control operation to make up for the voltage insufficiency from the system voltage;
a second control mode in which each of said half-bridge inverters is caused to output one pulse of voltage and is controlled by PWM control operation in regions of both edges of the pulse every half cycle of the system voltage, and said individual single-phase inverters are controlled by the PWM control operation to make up for the voltage insufficiency from the system voltage; and
means for selecting the first control mode if the voltage of said DC power supply is equal to or lower than a specific voltage, and selecting the second control mode if the voltage of said DC power supply exceeds the specific voltage.

12. The power converting apparatus as recited in claim 11 wherein the specific voltage is set at a level lower than a value twice as high as a DC input voltage of said single-phase inverters.

13. The power converting apparatus as recited in claim 9 wherein the voltage of said DC power supply is lower than a peak-to-peak value between maximum and minimum values of a phase voltage of said power system.

14. The power converting apparatus as recited in claim 9 wherein said DC power supply is a solar battery.

15. The power converting apparatus as recited in claim 14 wherein a rated voltage of said solar battery is defined in such a manner that a power burden born by said single-phase inverters every half cycle of the system voltage becomes zero at a point of the rated voltage of said solar battery.

16. The power converting apparatus as recited in claim 9 further comprising:
two series-connected capacitors for dividing a voltage of said DC power supply which is a DC input of said half-bridge inverters; and
a DC/DC converter between an input DC portion of said individual single-phase inverters and said two series-connected capacitors for bidirectionally transferring electric power.

17. A power converting apparatus comprising:
plural sets of half-bridge inverters connected between positive and negative terminals of a DC power supply, each set of half-bridge inverters including two series-connected switching devices; and
single-phase inverters connected in series with individual AC output lines of said plural sets of half-bridge inverters, wherein,
each of said half-bridge inverters is caused to output one pulse of voltage and is controlled by PWM control operation in regions of both edges of the pulse every half cycle of a system voltage, and said individual single-phase inverters are controlled by PWM control operation to make up for a voltage insufficiency from the system voltage, and
each of said half-bridge inverters is controlled by the PWM control operation during each period in the vicinity of a point at which the system voltage is zero and is caused to output the one pulse of voltage having a pulsewidth corresponding to each period in other than the period of the PWM control operation every half cycle of the system voltage.

18. The power converting apparatus as recited in claim 17 wherein said power converting apparatus includes:
a first control mode in which each of said half-bridge inverters is caused to output one pulse of voltage of which pulsewidth corresponds to the half cycle every half cycle of the system voltage and said individual single-phase inverters are controlled by the PWM control operation to make up for the voltage insufficiency from the system voltage;
a second control mode in which each of said half-bridge inverters is caused to output one pulse of voltage and is controlled by PWM control operation-in regions of both edges of the pulse every half cycle of the system voltage, and said individual single-phase inverters are controlled by the PWM control operation to make up for the voltage insufficiency from the system voltage; and
means for selecting the first control mode if the voltage of said DC power supply is equal to or lower than a specific voltage, and selecting the second control mode if the voltage of said DC power supply exceeds the specific voltage.

19. The power converting apparatus as recited in claim 18 wherein the specific voltage is set at a level lower than a value twice as high as a DC input voltage of said single-phase inverters.

20. The power converting apparatus as recited in claim 17 wherein the voltage of said DC power supply is lower than a peak-to-peak value between maximum and minimum values of a phase voltage of said power system.

21. The power converting apparatus as recited in claim 17 wherein said DC power supply is a solar battery.

22. The power converting apparatus as recited in claim 21 wherein a rated voltage of said solar battery is defined in such a manner that a power burden born by said single-phase inverters every half cycle of the system voltage becomes zero at a point of the rated voltage of said solar battery.

23. The power converting apparatus as recited in claim 17 further comprising:

two series-connected capacitors for dividing a voltage of said DC power supply which is a DC input of said half-bridge inverters; and a DC/DC converter between an input DC portion of said individual single-phase inverters and said two series-connected capacitors for bidirectionally transferring electric power.

* * * * *